US006898637B2

(12) United States Patent
Curtin

(10) Patent No.: US 6,898,637 B2
(45) Date of Patent: May 24, 2005

(54) DISTRIBUTED AUDIO COLLABORATION METHOD AND APPARATUS

(75) Inventor: Steven D. Curtin, Freehold, NJ (US)

(73) Assignee: Agere Systems, Inc., Allentown, PA (US)

( * ) Notice: Subject to any disclaimer, the term of this patent is extended or adjusted under 35 U.S.C. 154(b) by 869 days.

(21) Appl. No.: 09/756,767

(22) Filed: Jan. 10, 2001

(65) Prior Publication Data

US 2002/0091847 A1 Jul. 11, 2002

(51) Int. Cl.[7] .............................................. G06F 15/18
(52) U.S. Cl. ...................... 709/231; 709/205; 709/219
(58) Field of Search ................................ 709/231, 205, 709/219

(56) References Cited

U.S. PATENT DOCUMENTS

| | | | | | |
|---|---|---|---|---|---|
| 5,617,539 | A | * | 4/1997 | Ludwig et al. | 709/205 |
| 5,854,893 | A | * | 12/1998 | Ludwig et al. | 709/204 |
| 5,867,653 | A | * | 2/1999 | Aras et al. | 709/204 |
| 5,974,446 | A | * | 10/1999 | Sonnenreich et al. | 709/204 |
| 6,343,313 | B1 | * | 1/2002 | Salesky et al. | 709/204 |
| 6,584,493 | B1 | * | 6/2003 | Butler | 709/204 |
| 6,614,781 | B1 | * | 9/2003 | Elliott et al. | 370/352 |
| 6,622,171 | B2 | * | 9/2003 | Gupta et al. | 709/231 |
| 6,711,622 | B1 | * | 3/2004 | Fuller et al. | 709/231 |

OTHER PUBLICATIONS

Self–consistent modeling of low pressure microwave discharges including non–collisional heating processes Grotjohn, T.A.; Curtin, S.; Pulsed Power Plasma Science, 2001. IEEE Conference Record—Abstracts, Jun. 17–22, 2001 pp.: 272.*

Evaluation of the protocols within the CODE mesh VSAT network Fairhurst, G.; Glover, P.; de Bruin, F.; Networking Aspects of Small Terminal Satellite Systems, IEE Colloquium on, Nov 17, 1994 pp.: 1/1–1/8.*

Riding the new integrated media systems wave Nikias, C.L.; Signal Processing Magazine, IEEE, vol.: 14, Issue: 4, Jul. 1997 pp.: 32–33.*

Combining digital and analog signals for US IBOC FM broadcasting Liebe, R.F.; Surette, R.A.; Broadcasting, IEEE Transactions on, vol.: 48, Issue: 4, Dec. 2002 pp.: 361–364.*

* cited by examiner

*Primary Examiner*—Anthony Knight
*Assistant Examiner*—Michael B. Holmes
(74) *Attorney, Agent, or Firm*—Dickstein Shapiro Morin & Oshinsky LLP

(57) ABSTRACT

An Internet based music collaboration system is disclosed in which musicians and/or vocalists at client locations transmit audio signals to a server location where the audio signals are combined into a composite musical work and sent back to each of the client locations. The work may be sent back as a composite musical signal which is the concatenation of all individual audio signals or as a mix of audio signals.

46 Claims, 4 Drawing Sheets

DISTRIBUTED AUDIO COLLABORATION METHOD AND APPARATUS

FIELD OF THE INVENTION

The present invention is directed to a method and apparatus which allows audio signals from different sources to be combined and replayed back at the origination source of each audio signal.

BACKGROUND OF THE INVENTION

Many times musicians and/or vocalists desire to collaborate to form a musical work without the need for assembling all musicians/vocalists in a recording studio. Thus, the audio signal from different musical instruments, vocalists and/or other audio sources can be recorded individually at a location, then later mixed together to form a composite musical work, and then sent back to the musicians/vocalists. However, such activity cannot be performed in real time, and multiple musicians and/or vocalists wishing to collaborate in real rime from multiple locations cannot do so.

There are, however, conference call systems which allow multiple users wishing to make a conference call to do so without the use of an operator or a bridge number. However, such conference call devices do not allow multiple musicians/vocalists to collaborate in real time from multiple locations to form a composite work which each musician/vocalist can hear at the same time. Musicians/Vocalists attempting to collaborate by a conference call are also severely limited by the audio constraints of the telephone system, which typically does not pass any audio signals above 3000–4000 hertz, thereby providing a significant limitation on audio quality.

In an effort to more quickly form composite musical works, program servers have been developed which interface with the Internet and allow multiple musicians at different locations to use the Internet to send a MIDI audio streams over the Internet to the server, which mixes the audio sources using an MIDI merge function and feeds the merged MIDI signal back to participating musicians. However, this system, too, does not operate in real time, and cannot provide feedback to the musicians/vocalists while they are playing their instruments and/or singing their vocal part.

What is needed is a method and apparatus which can allow multiple musicians/vocalists at various locations to easily collaborate on a musical work and which provides near real time feedback of the collaborative work at the multiple locations at which the musicians/vocalists are located. What is also needed is a simplified high fidelity conference call system which does not require operator interaction to establish a conference connection.

SUMMARY OF THE INVENTION

In one aspect, the present invention provides a method and apparatus operating over a communications network, e.g., the Internet, which permits conference calls to be easily made by the streaming transmission of compressed audio signals from each participant client location to a server location where the individual audio signals are decompressed, combined into a composite audio signal, compressed and broadcast back to each of the client locations for decompression and play back. The composite audio signal can be a concatenation of the individual audio signals or a mix of the individual audio signals. The method and apparatus operates in near real time.

In another aspect, the present invention provides a distributed audio collaboration method and apparatus operated over a communications network, e.g., the Internet, in which each of a plurality of musicians/vocalists can transmit in streaming fashion their respective audio contributions to a collaborative musical work in compressed form from a client computer to a common server computer, which decompresses the audio contributions and combines the individual contributions into a composite audio signal which is in turn compressed and broadcast in streaming fashion by the server over the communications network back to each of the musicians/vocalists client computers which can decompress the composite audio signal for play back. The composite audio signal may be in the form of a concatenation of the individual audio contributions provided by each of the musicians/vocalists without any mixing of the contributions by the server, or the server can perform an actual mix of the audio contributions provided by each of the musicians/vocalists and provide the composite audio signal as a composite mix back to each of the musicians/vocalists. If the composite signal is a concatenation of the individual works, each musician/vocalist may at his own client computer location mix the received concatenated signals as desired. The audio collaboration method and apparatus operate in near real time.

These and other features and advantages of the invention will be more clearly understood from the following detailed description which is provided in connection with the accompanying drawings.

DETAILED DESCRIPTION OF THE INVENTION

The invention provides a network based method and apparatus for combining audio signals from different sources at respective client computers into a composite audio signal at a central server computer, and then providing the composite audio signal back to the individual client computers. The composite audio signal may be created by merely concatenating individual audio signals received from the client computers, and broadcasting the concatenated signals back to the client computers for mixing and replay, or the server computer may mix the received audio signals to form a composite mixed audio signal which is broadcast back to the client computers for replay. The method and apparatus may be used for conference calling, or for musician/vocalist collaboration in forming a collaborative musical work.

For simplicity, the method and apparatus of the invention will be described below in the context of forming a collaborative musical work in which the originating audio signals are from musical instruments or vocalists. However, the same illustrated and described method and apparatus may be used for conference calls with the originating audio sources being voice signals.

Figure 1:
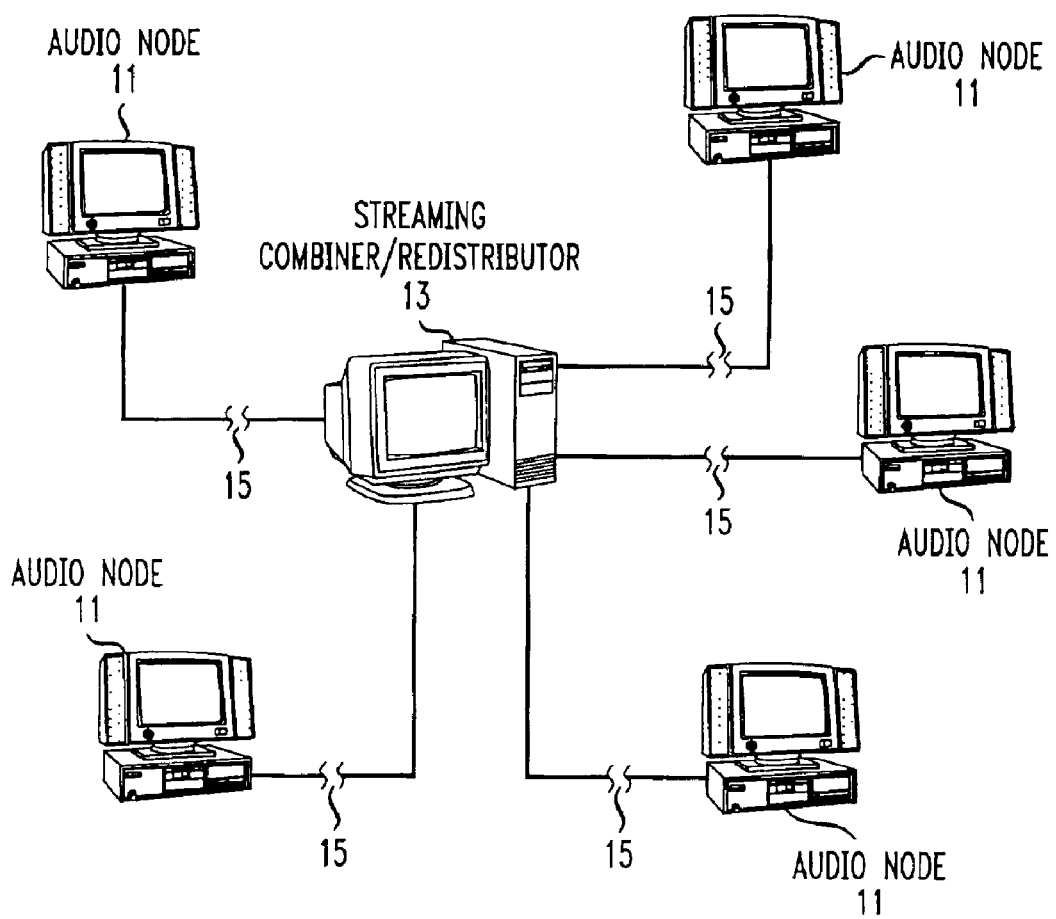
FIG. 1 shows a typical network, e.g., the Internet, which may be used to implement the invention.

FIG. 1 illustrates a networked environment in which the invention is used. Each of the musicians and/or vocalists are located at an audio node client computer 11 which is coupled through a communication link to a server computer 13. The communication link can be any digital transmission path including, for example, a wide area network or other network, but is preferably the Internet, indicated in FIG. 1 by numeral 15.

Each of the audio node client computers 11 is provided with streaming software which receives an audio signal source at the client computer 11 and converts it into an encoded (compressed) stream of digital packets which are sent over Internet 15 to server computer 13. The encoded audio packets are sent from the client computers 11 in real time, and the server computer 13 receives the encoded audio signals from each of the client computers 11, decodes (decompresses) them, and forms therefrom a composite audio signal which contains the audio signal streams from each of the client computers 11. The server computer encodes (compresses) the composite audio signal and transmits the encoded composite signal back to each of the client computers 11.

As a consequence, a musician/vocalist at a particular client computer may play his/her instrument or sing his/her part, and at the same time obtain near real time feedback from the server computer 13 of a composite audio signal, which includes his/her contribution, as well as the contributions of other musicians/vocalists at other client computers 11. Near real time refers to real time minus delays associated with the network transmission and computer processing functions.

The composite audio signal which is sent back from the server computer 13 either can be in the form of a concatenation of the audio signals from each of the client computers 11, that is encoded packet data which merely successively attaches the audio signals from each of the client computers 11 without mixing them, or a mixed audio signal formed by server computer 13 mixing the audio signals from the client computers 11 and providing a composite mix signal as packet data to each of the client computers 11.

Figure 2:
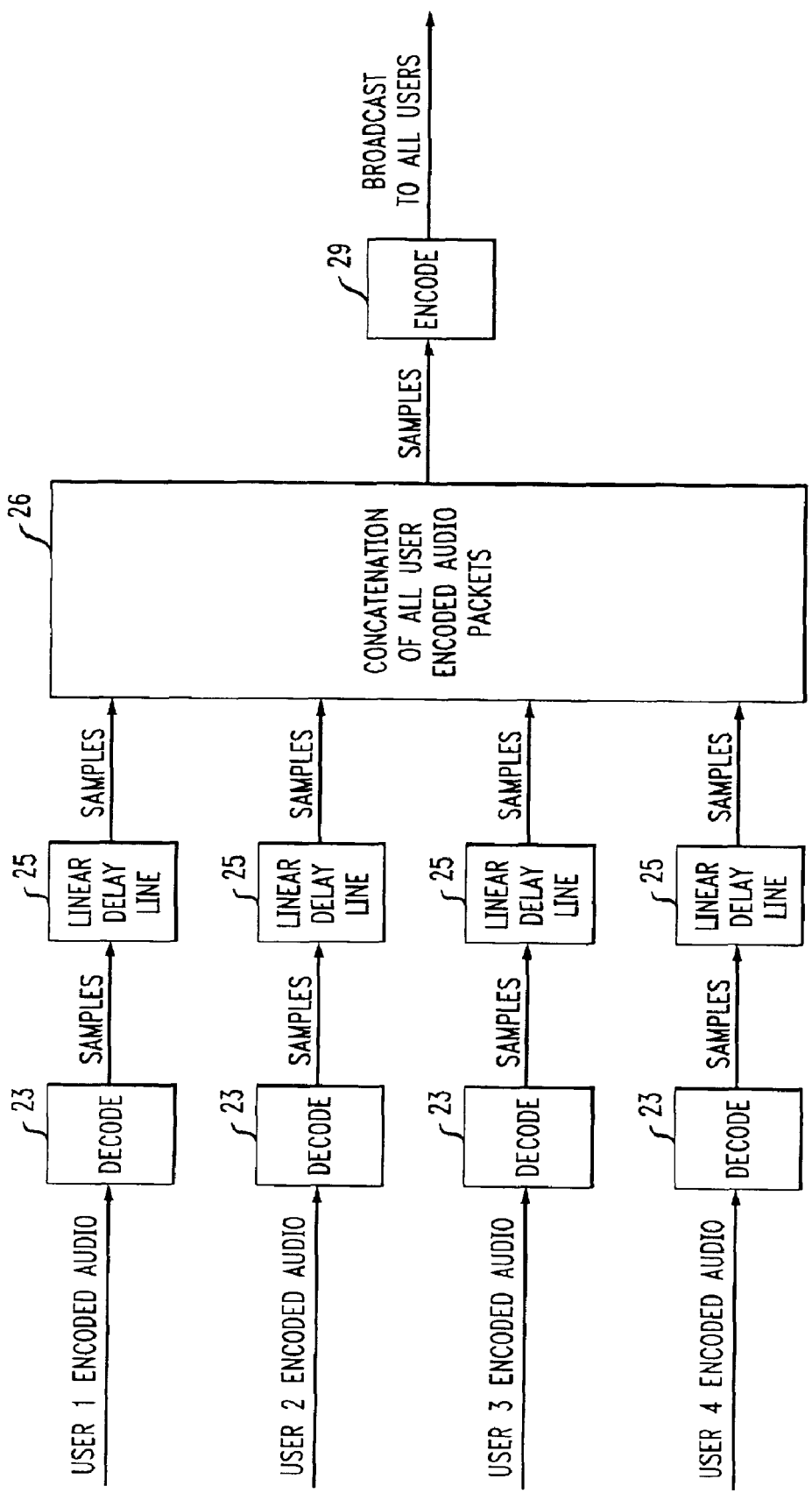
FIG. 2 is a block diagram of a server computer illustrated in FIG. 1 which is used to concatenate audio signals from a plurality of client computer sources.

FIG. 2 illustrates the structure and operations performed at server computer 13 when providing a concatenation of all received audio signal packets. As illustrated in FIG. 2, a plurality of users identified as User 1 . . . User 4, provide encoded (compressed) audio signals at each of their client computers 11. These encoded audio signals are received by the server computer 13 and are decoded (decompressed) by decoder 23 which is associated with each of the received audio signals, into respective audio signal samples. The samples are in turn fed to a respective linear delay line 25 which compensates for individual transmission delays of the respective audio signals, and the delayed samples are then sent to software within server computer 13 which concatenates, i.e., serially combines, all of the samples together in a concatenation module 26. That is, a long stream of sequential samples from each of the users is formed. This concatenation signal is then encoded (compressed) at the server computer 13 by encoder 29, and is then in turn rebroadcast over the Internet 15 back as a single signal in common to all of the client computers 11.

The manner in which the client computers 11 handle a composite audio signal formed by the concatenation of all user audio signals will be described below in connection with FIG. 5.

Figure 3:
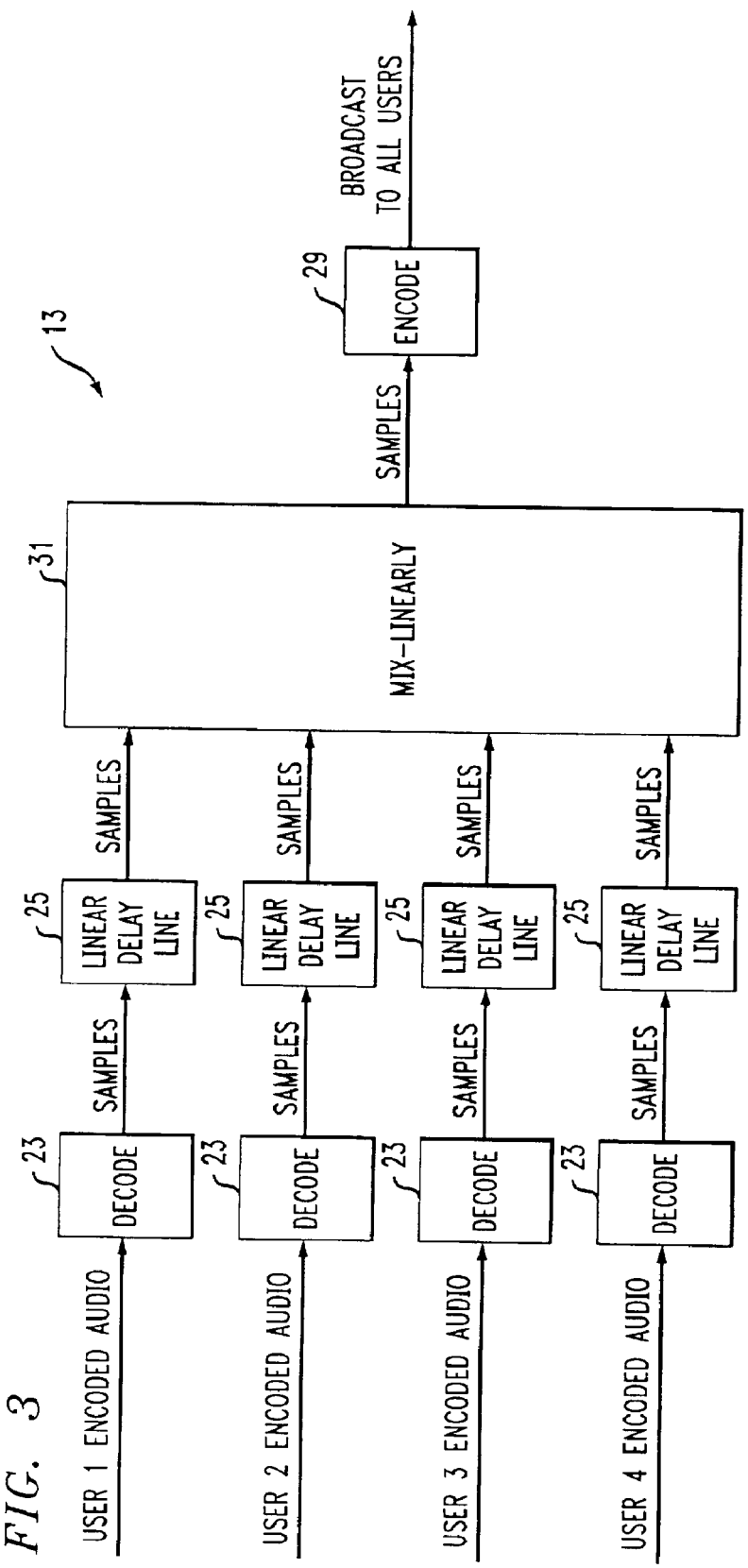
FIG. 3 is a block diagram of a server computer illustrated in FIG. 1 used to mix a plurality of audio signals from a plurality of client computer sources.

FIG. 3 illustrates the structure and operation of server computer 13 when it performs a mixing operation for the received audio signals from the users. The encoded audio signals from the individual client computers 11 are received at server computer 13 and each is decoded (decompressed) by decoder 23. Again, as in FIG. 2, the server computer 3 provides a linear delay line 25 for each decoded audio signal which compensates for individual delays in transmission of the received audio signals and provides the audio samples to a mixer module 31.

The mixer module 31 linearly sums the delayed outputs of the decoders 23, and provides a single mixed composite signal in the form of samples to an encoder 29, which encodes (compresses) those samples and then broadcasts them back to all client computers 11.

FIGS. 2 and 3 illustrate linear delay lines 25 which are provided in each of the audio signal receiving paths at server computer 13. The linear delay lines 25 are individually adjustable to time align the received audio signals from the various users in accordance with the transmission delays associated with each user. This way the audio signals from the various users are synchronized. In order to determine the appropriate delay for the received signals from a given user, a ping technique illustrated in FIG. 4 is employed.

Figure 4:
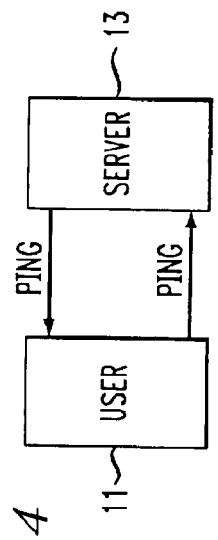
FIG. 4 is an illustration of a ping technique used between client and server computers illustrated in FIG. 1 for determining transmission delays.

In the ping technique shown in FIG. 4, the server computer 13 sends a ping message to a client computer 11. Upon receipt of the ping message, the client computer 11 time stamps the message and resends it in a ping message back to the server computer 13. The server computer 13, upon receiving the time stamp message from the client computer 11, compares the time stamp with the time at which the message is actually received, the time difference representing the transmission time for a message to travel from client computer 11 to server computer 13. This pinging is done for each of the client computers 11 illustrated in FIG. 1, and the server 13 accordingly adjusts each of the linear delay lines 25 for the received audio signals to ensure that all are properly time aligned by eliminating effects of transmission delays in the time of receipt of the respective audio signals.

Figure 5:
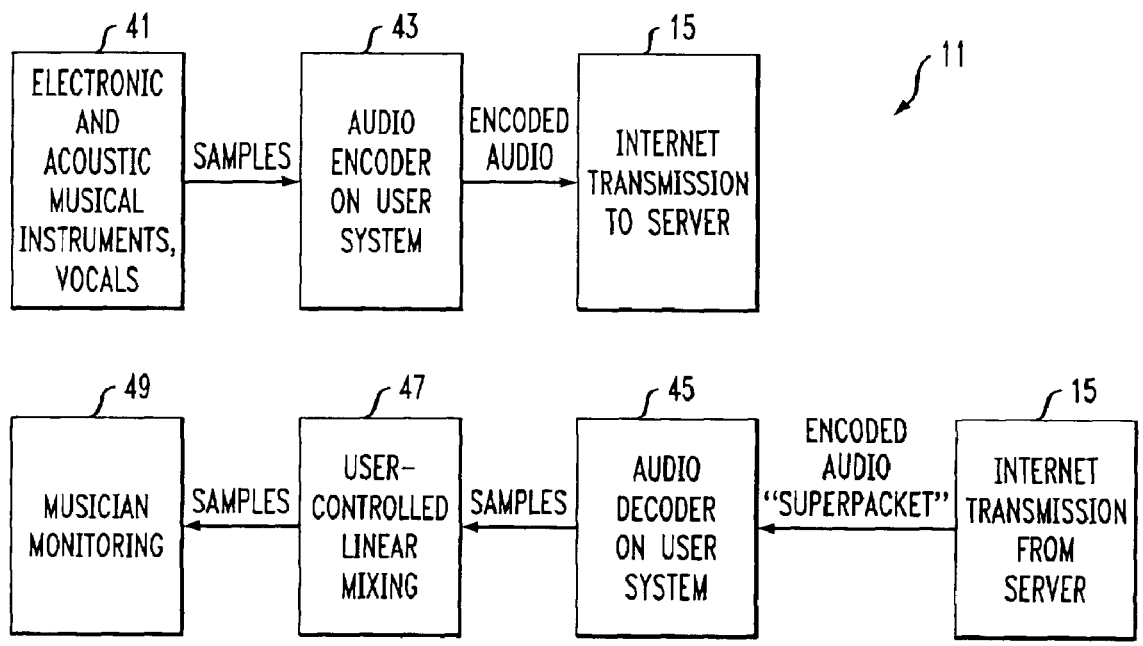
FIG. 5 is a block diagram of a client computer which receives a concatenated audio transmission from a server computer.

FIG. 5 illustrates the structure and operations of the client computers 11 when the server computer 13 concatenates the individual received audio signals. A source 41 of electronic and/or acoustic musical instruments and/or vocals provides digital samples of an input audio analog signal to an audio encoder 43. Audio encoder 43 compresses the audio signal using any one of many conventional audio signal compression techniques, e.g., MP3, PAC (perceptual audio coder), Dolby AC-3, MPEG-4, etc. The encoded audio signal is then sent over the Internet 15 to the server computer 13. The client computer 11 also receives from the Internet 15 the encoded audio composite music signal which, in the case of the FIG. 5 implementation, represents the concatenation of the individual audio sources by the server computer 13.

The audio signals received at client computer 11 are then decoded (decompressed) at decoder 45, and the decoded samples are then sent to a user controlled linear mixing device 47, and the audio samples from the user controlled linear mixing device are then fed to a monitoring device 49 such as an audio reproduction circuit where the digital audio samples are converted to an analog audio signal for replay over one or more audio channels and associated speakers. It should be noted that the user has his/her own control over the linear mixing in mixing module 47, and can appropriately adjust the mixing conditions to produce a desired audio output at the monitoring device 49.

Figure 6:
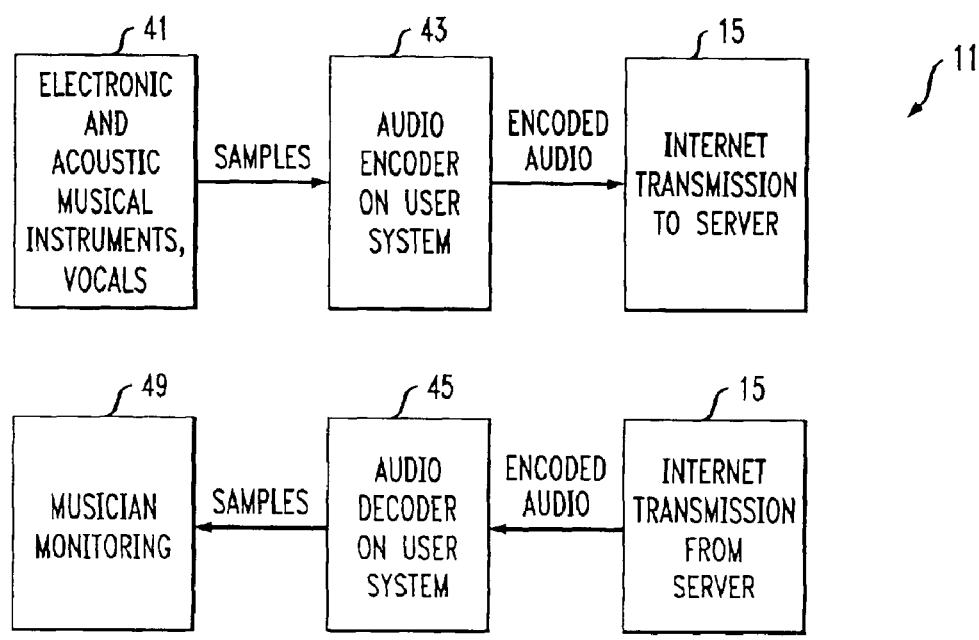
FIG. 6 illustrates a client computer which receives a previously mixed composite audio transmission from a server computer.

FIG. 6 illustrates the client computer 11 when configured to operate with a server computer 13 which mixes the audio signals received from the client computers 11. Once again, a source of electronic and acoustic musical instruments and/or vocals is provided at source 41 which provides digital samples of an analog audio signal to an audio encoder 43 which transmits the encoded audio signal over the Internet 15 to computer server 13.

FIG. 6 also illustrates the reception at client computer 11 of the Internet 15 transmission from the server 13. In the FIG. 6 arrangement, the server computer 13 has already mixed the audio signals from the individual client computers 11 so that a mixed signal is received at the client computer 11. This received mixed signal is then decoded by decoder 45, and decoded samples are fed to a musician monitoring device 49 which includes an audio circuit and one or more speakers, as described above with reference to FIG. 5.

As noted above, the invention allows a musician/vocalist to collaborate with other musicians/vocalists at diverse locations in near real time to create a collaborative musical work which all musicians/vocalists can receive and hear at nearly the same time they are making their contribution to the collaborative work. Since the audio signals can be sampled and transmitted with high fidelity, the resulting composite work as replayed at the musician sites is likewise of high fidelity.

For lower bandwidth applications and in order to allow lower bit rate audio encoding and decoding, and to provide a uniform standard for communication of musical gestures, all music information can be provided in MIDI format or other structured audio formats, such as C-sound or MPEG-4 SAOL at both the client computers 11 and server computer 13 rather than being encoded/decoded. In this case, the server computer 13 when mixing the audio signals can use a conventional MIDI merge function. Moreover, although the invention has been described as using exemplary MP3, PAC, Dolby AC-3 and MPEG-4 encoding/decoding at the client computer 11 and server computer 13 locations, other conventional and available audio encoding/decoding techniques can be used as well.

While the invention has been described and illustrated with respect to exemplary embodiments, it should be understood that various modifications, substitutions, deletions and additions can occur without departing from the spirit and scope of the invention. Accordingly, the invention is not to be considered as limited by the foregoing description, but is only limited by the scope of the appended claims.

What is claimed as new and desired to be protected by Letters Patent of the United States is:

1. An audio transmission method comprising:
 (a) receiving digital audio information from a plurality of client sources at a server location;
 (b) combining said received digital audio information to form a combined digital audio signal; and
 (c) transmitting said combined digital audio signal to said client sources;
 wherein steps (a), (b) and (c) are performed in near real time.

2. A method as in claim 1 wherein said combining and transmitting operations further comprise:
 concatenation of said audio information received from said plurality of client sources and transmitting said concatenated audio information to said client sources.

3. A method as in claim 1 wherein said combining and transmitting operations further comprise:
 mixing said received digital audio information at said server location and transmitting said mixed digital audio information to said client sources.

4. A method as in claim 1 wherein said digital audio information is received from the Internet and said transmitting of said combined audio information is an Internet transmission.

5. A method as in claim 3 further comprising compensating said received digital audio information for transmission time delays before performing said mixing.

6. A method as in claim 5 wherein each received digital audio information is compensated for a transmission delay between its associated client source and said server location.

7. A method as in claim 6 further comprising transmitting a ping message from said server location to each said client source, determining said delay from the time of arrival of a reply ping message from each client source, and using said determined delay from each client source to adjust the timing of respective digital audio information received from a said client source prior to said linear mixing operation.

8. A method as in claim 1 wherein said received digital audio information is in a compressed audio signal format.

9. A method as in claim 1 wherein said combined digital audio information is in a compressed audio signal format.

10. An audio transmission method comprising:
 transmitting first digital audio information from a client source to a digital transmission system;
 receiving second digital audio information at said client source from said digital transmission system, said second digital audio information including said first digital audio information from said client source and additional digital audio information from at least one other client source, said transmitting and receiving operations being performed in near real time.

11. A method as in claim 10 wherein said second digital audio information is concentrated digital audio information which includes said first digital audio information from said client source and aid additional digital audio information.

12. A method as in claim 11 further comprising linearly mixing at said client source said concentrated digital audio information.

13. A method as in claim 12 further comprising playing said linearly mixed digital audio information at said client source location.

14. A method as in claim 10 wherein said second digital audio information is a mix of audio information contained in said first digital audio information with other audio information.

15. A method as in claim 14 wherein said other audio information is audio information from at least one other client source.

16. A method as in claim 14 further comprising playing said second digital audio information at said client source location.

17. A method as in claim 10 wherein said first digital audio information is in a compressed audio signal format.

18. A method as in claim 10 wherein said second digital audio information is in a compressed audio signal format.

19. An apparatus for handling audio information comprising:
 a receiver for receiving compressed digital audio information from a plurality of client sources over a digital network;
 a signal combiner which decompresses said compressed audio signal information and combines received digital decompressed audio information from said plurality of client sources into a combined compressed digital audio signal; and a transmitter for transmitting said combined compressed digital audio signal to said client sources over said digital network, wherein said receiver, signal combiner and transmitter operate in near real time.

20. An apparatus as in claim 19 wherein said signal combiner concentrates received digital audio information from said plurality of client sources to form said combined digital audio signal.

21. An apparatus as in claim 19 wherein said signal combiner mixes received digital audio information to form said combined digital audio signal.

22. An apparatus as in claim 19 wherein said digital network includes the Internet.

23. An apparatus as in claim 19 further comprising a variable delay system for compensating said received digital audio information for transmission time delays.

24. An apparatus as in claim 22 wherein said variable delay system comprises a respective delay element for each said received digital audio information.

25. An apparatus as in claim 24 wherein said receiver, combiner and transmitter are provided at a server location, said apparatus further comprising a ping component at said server location for transmitting a ping signal to each of said client sources, for receiving a reply ping signal from said client sources, and for determining a transmission delay for each client source, said ping component using said determined delay to adjust a respective delay element.

26. An apparatus for handling audio information comprising:

a transmitter for transmitting first compressed digital audio information from a client source to a digital transmission system;

a receiver at said client source for receiving second compressed digital audio information from said digital transmission system, said second compressed digital audio information including said first audio information transmittal from said client source and additional digital audio information from at least one other client source, said transmitter and receiver operating in near real time.

27. An apparatus as in claim 26 further comprising a mixer at said client source for mixing said first digital audio information, and said additional digital audio information to produce mixed digital audio information.

28. An apparatus as in claim 27 further comprising an audio playback device for playing said mixed digital audio information at said client source location.

29. An apparatus as in claim 26 further comprising a decoder for decompressing said second compressed digital audio information and providing a decompressed audio signal.

30. An apparatus as in claim 27 further comprising a decoder for decompressing said second compressed digital audio information, said mixer mixing audio signals at the output of said decoder to provide a mixed decompressed audio signal.

31. An apparatus as in claim 29 further comprising an audio reproduction circuit for playing said decompressed audio signal.

32. An apparatus as in claim 30 further comprising an audio reproduction circuit for playing said mixed decompressed audio signal.

33. An method as in claim 1, wherein said digital audio information is unique to each of said plurality of client sources, and said combined digital audio signal is identical for each source.

34. A method as in claim 1, wherein said digital audio information is generated virtually simultaneously at each of said plurality of client sources.

35. An audio transmission method comprising:

(a) receiving digital audio information simultaneously from a plurality of client sources at a server location, digital audio information received from each source representing a unique part of a composite work;

(b) combining said received digital audio information to form a combined digital audio signal representing said composite work; and (c) transmitting said combined digital audio signal to said client sources;

wherein steps (a), (b) and (c) are performed in near real time.

36. A method as in claim 35, wherein said client sources are music performers collaborating to create said composite work.

37. A method as in claim 35, wherein at least one of said musical performers from said plurality of client sources is not assembled with remaining musical performers from said plurality of client sources.

38. A method as in claim 35 wherein said combining and transmitting operations further comprise:

concatenation of said audio information received from said plurality of client sources and transmitting said concatenated audio information to said client sources.

39. A method as in claim 35 wherein said digital audio information is received from the Internet and said transmitting of said combined audio information is an Internet transmission.

40. A method as in claim 35 wherein said combining and transmitting operations further comprise:

mixing said received digital audio information at said server location and transmitting said mixed digital audio information to said client sources.

41. A method as in claim 40 further comprising compensating said received digital audio information for transmission time delays before performing said mixing.

42. A method as in claim 41 wherein each received digital audio information is compensated for a transmission delay between its associated client source and said server location.

43. A method as in claim 42 further comprising transmitting a ping message from said server location to each said client source, determining said delay from the time of arrival of a reply ping message from each client source, and using said determined delay from each client source to adjust the timing of respective digital audio information received from a said client source prior to said linear mixing operation.

44. A method as in claim 35 wherein said received digital audio information is in a compressed audio signal format.

45. A method as in claim 35 wherein said combined digital audio information is in a compressed audio signal format.

46. A method as in claim 2, further comprising receiving said second digital audio information at said at least one other client source simultaneously with said client source.

* * * * *